United States Patent
Ogata

(10) Patent No.: US 10,343,100 B2
(45) Date of Patent: Jul. 9, 2019

(54) PLUGGED HONEYCOMB STRUCTURE

(71) Applicant: NGK INSULATORS, LTD., Nagoya (JP)

(72) Inventor: Takayuki Ogata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/426,352

(22) Filed: Feb. 7, 2017

(65) Prior Publication Data

US 2017/0232377 A1 Aug. 17, 2017

(30) Foreign Application Priority Data

Feb. 17, 2016 (JP) .................................. 2016-028354

(51) Int. Cl.
  *B01D 46/24* (2006.01)
  *B01D 53/94* (2006.01)
  (Continued)

(52) U.S. Cl.
  CPC ....... *B01D 46/2459* (2013.01); *B01D 46/247* (2013.01); *B01D 46/2429* (2013.01); *B01D 53/94* (2013.01); *B01J 21/04* (2013.01); *B01J 27/224* (2013.01); *B01J 35/04* (2013.01); *B32B 3/12* (2013.01); *C04B 38/0006* (2013.01); *F01N 3/0222* (2013.01); *F01N 3/2828* (2013.01); *B01D 2046/2433* (2013.01); *B01D 2046/2437* (2013.01); *B01D 2046/2481* (2013.01); *B01D 2046/2492* (2013.01); (Continued)

(58) Field of Classification Search
  CPC ....... C04B 2111/00793; C04B 38/0006; C04B 35/00; C04B 38/0054; C04B 38/0074; B01D 46/2429; B01D 2046/2492; B01D 2046/2437; B01D 2046/2433; B01D 53/94; B01D 46/247; B01D 46/2459; B01D 2046/2481; B01J 35/04; B01J 27/224; B01J 21/04; B32B 3/12; F01N 3/2828; F01N 3/0222; F01N 2330/34; Y02T 10/20; Y10T 428/24149; Y10T 428/24157; Y10T 428/24165

See application file for complete search history.

(56) References Cited

U.S. PATENT DOCUMENTS

| 7,128,961 | B2 | 10/2006 | Kai et al. | |
|---|---|---|---|---|
| 2004/0071931 | A1 | 4/2004 | Kai et al. | |
| 2011/0236628 | A1* | 9/2011 | Soukhojak | C04B 35/185 428/116 |

FOREIGN PATENT DOCUMENTS

JP 2004-132266 A1 4/2004

* cited by examiner

*Primary Examiner* — Michael E. La Villa
(74) *Attorney, Agent, or Firm* — Burr & Brown, PLLC

(57) ABSTRACT

A plugged honeycomb structure includes a honeycomb structure body, and a plurality of plugging portions, the honeycomb structure body further includes pass-through hole portions each of which is formed in at least a part of a partition wall intersection portion in which the partition walls intersect in one end face and each of which interconnects a pair of cells facing each other at a position corresponding to the partition wall intersection portion to enable pass-through of a fluid, and a value obtained by dividing a diameter of a first virtual inscribed circle inscribed at a position of a minimum hole width of the pass-through hole portion by a diameter of a second virtual inscribed circle inscribed at a position of a minimum plugging width between the plugging portions facing each other is in a range of 0.05 to 0.74.

8 Claims, 6 Drawing Sheets

(51) Int. Cl.
  *B01J 21/04*     (2006.01)
  *B01J 35/04*     (2006.01)
  *B01J 27/224*    (2006.01)
  *F01N 3/28*      (2006.01)
  *C04B 38/00*     (2006.01)
  *B32B 3/12*      (2006.01)
  *F01N 3/022*     (2006.01)
  *C04B 111/00*    (2006.01)

(52) U.S. Cl.
  CPC .  *C04B 2111/00793* (2013.01); *F01N 2330/34* (2013.01); *Y02T 10/20* (2013.01); *Y10T 428/24149* (2015.01); *Y10T 428/24157* (2015.01); *Y10T 428/24165* (2015.01)

PLUGGED HONEYCOMB STRUCTURE

"The present application is an application based on JP-2016-028354 filed on Feb. 17, 2016 with Japan Patent Office, the entire contents of which are incorporated herein by reference."

BACKGROUND OF THE INVENTION

Field of the Invention

The present invention relates to a plugged honeycomb structure, and more particularly, it relates to a plugged honeycomb structure which is for use in an exhaust gas purifying device, a particulate trapping filter, or the like and includes plugging portions with which parts of cells are plugged.

Description of the Related Art

Heretofore, an exhaust gas emitted from an internal combustion engine such as a car engine includes toxic substances such as carbon monoxide (CO), hydrocarbons (HC) and nitrogen oxides ($NO_x$). These toxic substances cannot be discharged to the atmosphere as they are because they have an influence on natural environments, human bodies and others. To eliminate such a problem, an exhaust gas purifying device (or a particulate trapping filter) to remove and purify the above toxic substances is usually disposed in the middle of emission through channels of the exhaust gas.

In the exhaust gas purifying device, for example, a honeycomb structure made of a porous ceramics material is used as a catalyst carrier, and in partition walls of the honeycomb structure, there is used a honeycomb catalyst body onto which an SCR catalyst or the like is loaded is used. Here, the honeycomb structure as the catalyst carrier includes the porous partition walls defining a plurality of cells extending from one end face to the other end face and formed as through channels for a fluid. Furthermore, plugging portions are formed to cells of the one end face in accordance with a predetermined arrangement standard, and the plugging portions are similarly formed to the residual cells of the other end face.

When the plugged honeycomb structure of the above constitution is used in the exhaust gas purifying device, the exhaust gas flows into the plugged honeycomb structure from the cells of the one end face in which the plugging portions are not disposed, passes through the partition walls and is finally emitted out from the cells of the other end face in which the plugging portions are not disposed. At this time, the exhaust gas passes through the porous partition walls, the partition walls therefore function as a filtering material, and particulates included in the exhaust gas are trapped in the partition walls and on the surfaces of the partition walls.

Consequently, it is possible to remove the particulates from the exhaust gas. Here, when the trapping of the particulates by the plugged honeycomb structure continues, and a lot of particulates are deposited on the surfaces of the partition walls, thereby obstructing pass-through properties of the exhaust gas. As a result, a difference in pressure is made between an inflow side of the exhaust gas (one end face side) and an outflow side (the other end face side), and so-called pressure loss is generated. In consequence, suitable pass-through of the exhaust gas is impaired and fuel efficiency (output) deteriorates.

Thus, the exhaust gas is treated as much as constant time or amount, and then there is performed a particulate removing treatment of, for example, injecting fuel to react the particulates deposited mainly on the surfaces of the partition walls with oxygen included in the atmosphere and gasifying the particulates into carbon dioxide to remove the particulates.

That is, in the exhaust gas purifying device in which the plugged honeycomb structure is used, a treatment of heating and removing the particulates deposited on the partition walls becomes essential, and in a case where an amount of the particulates to be deposited on the partition walls is large, frequency of the particulate removing treatment increases. As a result, the fuel efficiency might deteriorate. Additionally, when removing the particulates by the heating, it is difficult to gasify all the particulates deposited on the partition walls, and there is the possibility that parts of the particulates still remain as ash on the surfaces of the partition walls.

Furthermore, in the plugged honeycomb structure, parts of the cells of the one end face and the other end face are plugged, respectively, and hence there has been the large tendency that the pressure loss in an initial state prior to the treatment of the exhaust gas increases from the beginning as compared with a usual honeycomb structure.

Thus, as a plugged structure to remove the particulates included in the exhaust gas, there has been suggested a honeycomb structure in which it is possible to remove the particulates deposited on the partition walls and to decrease a residual amount of the ash after the particulates are removed, without requiring any special mechanisms, devices and others (see Patent Document 1).

Consequently, at least a part of a partition wall intersection region where the partition wall intersects the partition wall in a lattice-like manner includes "an intersection-less portion" in which the partition wall of a portion corresponding to the partition wall intersection region is not present. Thus, the intersection-less portion is disposed, and hence it is possible to inhibit the increase of pressure loss in a case where the plugged honeycomb structure is used in the exhaust gas purifying device or the like and it is possible to minimize the frequency of a particulate removing treatment by heating.

[Patent Document 1] JP-A-2004-132266

SUMMARY OF THE INVENTION

However, in recent years, various regulations on an exhaust gas emitted from a diesel engine or the like have strictly been strengthened. Therefore, there is the advanced development of a honeycomb structure in which it is possible to efficiently achieve removal of particulates included in the exhaust gas to be emitted and purification of toxic substances in the exhaust gas and it is possible to decrease pressure loss in an initial state and after the honeycomb structure is used.

Thus, the present invention has been developed in view of the above circumstances, and an object thereof is to provide a plugged honeycomb structure which maintains a high trapping efficiency of particulates and a high purification efficiency of toxic substances and which achieves decrease of pressure loss, in a case of using the plugged honeycomb structure as an exhaust gas purifying device or the like.

According to a first aspect of the present invention, a plugged honeycomb structure is provided including a honeycomb structure body having partition walls defining a plurality of cells extending from one end face to the other end face, and a plurality of plugging portions with which the cells of the one end face are plugged in accordance with a predetermined arrangement standard and with which the residual cells of the other end face are plugged in accordance with the arrangement standard, wherein the honeycomb structure body further includes pass-through hole portions each of which is formed in at least a part of a partition wall intersection portion in which the partition walls intersect in one of the one end face and the other end face and each of which interconnects a pair of cells facing each other at a position corresponding to the partition wall intersection portion and opening on the side of the one end face or the other end face to enable pass-through of a fluid, and a value obtained by dividing a diameter of a first virtual inscribed circle inscribed at a position of a minimum hole width of the pass-through hole portion by a diameter of a second virtual inscribed circle inscribed at a position of a minimum plugging width between the plugging portions facing each other is in a range of 0.05 to 0.74.

According to a second aspect of the present invention, the plugged honeycomb structure according to the above first aspect is provided, wherein a minimum distance of intersection portion partition wall thicknesses from hole walls of the pass-through hole portions to intersection portions of the plugging portions is ½ or more of a partition wall thickness of the partition walls.

According to a third aspect of the present invention, the plugged honeycomb structure according to the above first or second aspects is provided, wherein the number of the partition wall intersection portions in which the pass-through hole portions are formed is in a range of 10% or more and 50% or less to a total number of the partition wall intersection portions in the one end face or the other end face.

According to a fourth aspect of the present invention, the plugged honeycomb structure according to any one of the above first to third aspects is provided, wherein each of the cells is connected to three pass-through hole portions at maximum to interconnect the cells facing each other.

According to a fifth aspect of the present invention, the plugged honeycomb structure according to any one of the above first to third aspects is provided, wherein each of the cells is connected to one pass-through hole portion to interconnect the cells facing each other.

According to a sixth aspect of the present invention, the plugged honeycomb structure according to any one of the above first to fifth aspects is provided, wherein the honeycomb structure body contains a cordierite component or a silicon carbide component.

According to a seventh aspect of the present invention, the plugged honeycomb structure according to any one of the above first to sixth aspects is provided, wherein the cells possess one of a regular quadrangular shape and a regular hexagonal shape.

According to an eighth aspect of the present invention, the plugged honeycomb structure according to any one of the above first to seventh aspects is provided, wherein the honeycomb structure body is a porous ceramic material in which a porosity is in a range of 30% to 80% and an average pore diameter is in a range of 5 μm to 30 μm.

According to a plugged honeycomb structure of the present invention, pass-through hole portions interconnecting cells are arranged, it is therefore possible to increase an open frontal area or a geometric surface area of the plugged honeycomb structure, and it is possible to decrease pressure loss in an initial state and in a state where particulates of soot and the like are adhered.

Additionally, a hole width of the pass-through hole portion is adjusted to an optimum value, and hence it is possible to increase the geometric surface area or the like, to increase a contact area with a fluid such as an exhaust gas and to improve a purification efficiency.

DESCRIPTION OF THE PREFERRED EMBODIMENTS

Hereinafter, one example of an embodiment of a plugged honeycomb structure of the present invention will be described with reference to the drawings. It is to be noted that the present invention is not especially limited to the following embodiment, and changes, modifications, improvements and others are addable without departing from the gist of the present invention.

1. Plugged Honeycomb Structure

Figure 1:
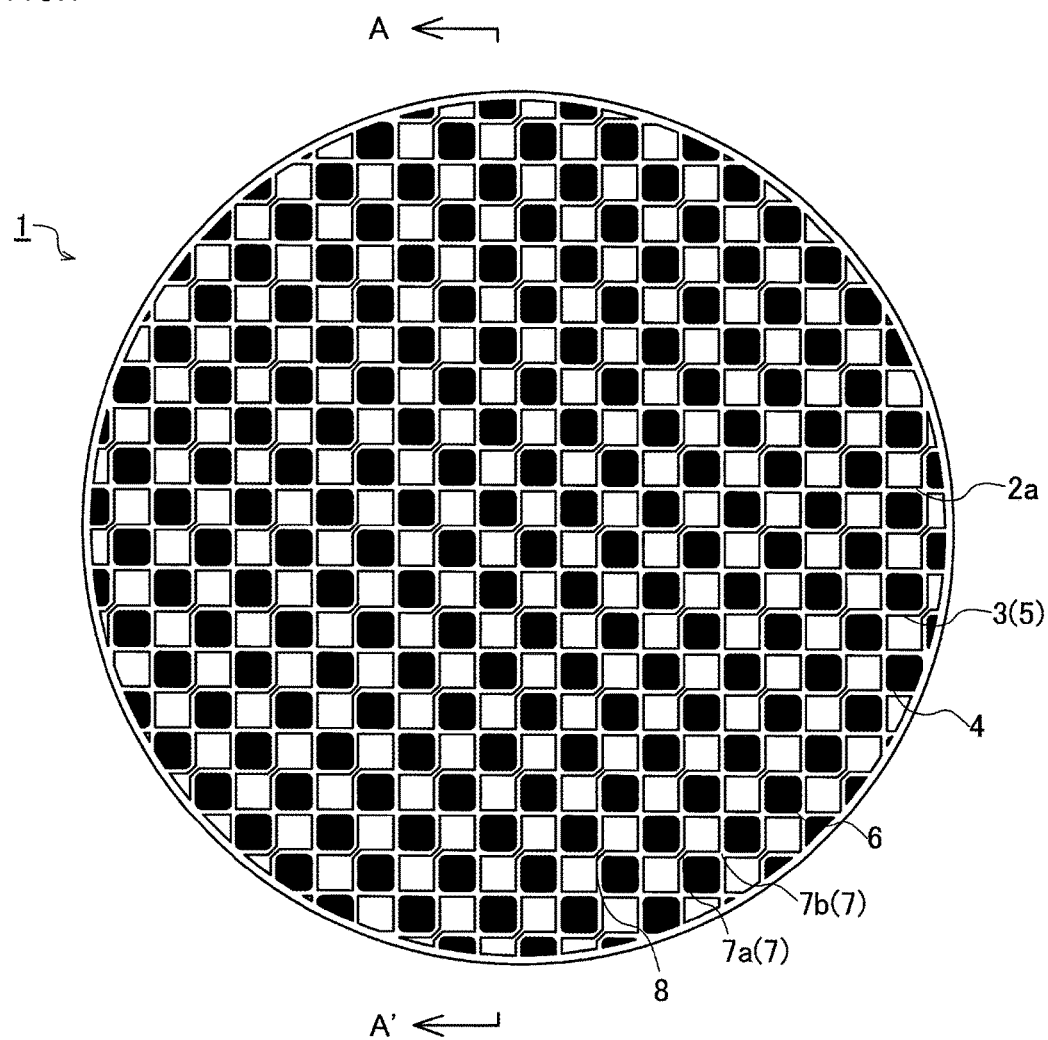
FIG. 1 is a plan view showing a schematic constitution of a plugged honeycomb structure of the present embodiment.
Figure 2:
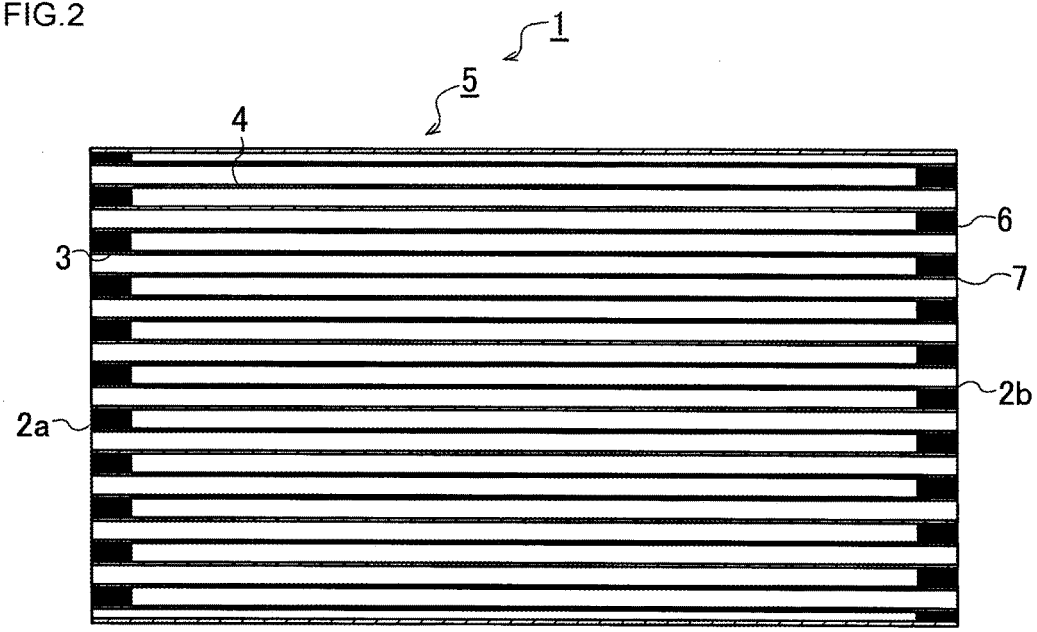
FIG. 2 is a reduced cross-sectional view along the A-A' line of FIG. 1 showing the schematic constitution of the plugged honeycomb structure.

As shown in FIG. 1 and FIG. 2, a plugged honeycomb structure 1 of one embodiment of the present invention includes a honeycomb structure body 5 having partition walls 4 defining a plurality of cells 3 extending from one end face 2a to the other end face 2b, and a plurality of plugging portions 6 with which the cells 3 of the one end face 2a are plugged in accordance with a predetermined arrangement standard and with which the residual cells 3 of the other end face 2b are plugged in accordance with the arrangement standard.

Here, in the arrangement standard to arrange the plugging portions 6, there is employed a so-called "checkered pattern (or a checkerboard pattern)" in which the plugging portions 6 are alternately arranged in the respective cells 3. Furthermore, the plugged honeycomb structure 1 of the present embodiment has the lattice-like (cross-shaped) partition walls 4 ad the cells 3 are formed into a regular quadrangular shape. It is to be noted that a structure itself of the plugged honeycomb structure 1 is an already known constitution, and hence description of its details is omitted.

As a characteristic structure of the plugged honeycomb structure 1 of the present embodiment, in one of the one end face 2a and the other end face 2b, in at least a part of a partition wall intersection portion 7 in which the partition wall 4 intersects the partition wall 4, there is disposed a pass-through hole portion 8 in which a part of the partition wall 4 at a corresponding position of the partition wall intersection portion 7 is not present, and each of which interconnects a pair of cells 3 facing each other and opening on the side of the one end face 2a or the other end face 2b to enable pass-through of a fluid such as an exhaust gas. It is to be noted that in a case where the one end face 2a side is defined as an inlet side of the fluid and the other end face 2b side is defined as an outlet side of the fluid, each of the pass-through hole portions 8 is disposed only in "an inlet-inlet cell" which interconnects the cells on the inlet side (the inlet cells), or "an outlet-outlet cell" which interconnects the cells on the outlet side (the outlet cells).

The pass-through hole portion 8 extends from the one end face 2a to the other end face 2b (or from the other end face 2b to the one end face 2a) in an axial direction of the plugged honeycomb structure 1 (corresponding to an inner direction in FIG. 1) and is formed to reach the plugging portion 6 disposed in the other end face 2b (or the one end face 2a). That is, the plugged honeycomb structure 1 of the present embodiment has the pass-through hole portions 8 each of which interconnects the pair of diagonally disposed cells 3, and a fluid such as an exhaust gas can freely flow through both the cells 3.

Figure 3:
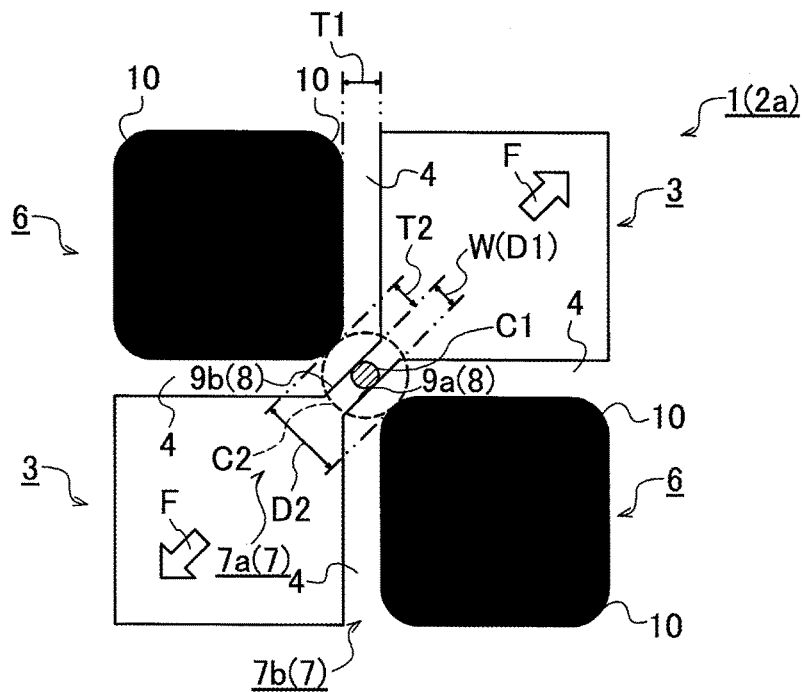
FIG. 3 is a partially enlarged plan view of FIG. 1 showing the schematic constitution of the plugged honeycomb structure.

Further specifically, the pass-through hole portion 8 is constituted of linear hole walls 9a and 9b disposed as much as a constant hole width W away from each other, and in parallel with each other, and has a groove-like structure in which a space is formed between the hole walls 9a and 9b (see FIG. 3).

A shape of the pass-through hole portion 8 is not formed by the linear hole walls 9a and 9b shown in the drawing, but may be formed by, for example, curved surfaces curved in a convex shape to the space between the hole walls as long as the fluid can pass through the portion between the pair of cells 3. It is to be noted that in a case where the pass-through hole portion is formed by the linear hole walls 9a and 9b as in the plugged honeycomb structure 1 of the present embodiment, the constant hole width W corresponds to a minimum hole width in the present invention. On the other hand, in a case where the pass-through hole portion is formed by the above curved surfaces curved in the convex shape, a distance between vertexes of the curved surfaces corresponds to the minimum hole width.

Furthermore, a pair of plugging portions 6 are arranged at positions each of which is perpendicular to a flow direction F (see FIG. 3) of the fluid in the pass-through hole portion 8. Here, the plugging portion 6 is formed by charging a predetermined amount of plugging material from the cell 3 of the one end face 2a (or the other end face 2b) and drying the material, whereby the material is charged from the one end face 2a (or the other end face 2b) to a constant depth to form the plugging portion.

The formed plugging portion 6 possesses a substantially quadrangular shape, and each of four corners has an intersection portion 10 formed by chamfering the corner at a predetermined curvature radius R (hereinafter, "the intersection portion of the curvature radius R" will be referred to as "the intersection R" sometimes). That is, the plugging portion 6 has the intersection portions 10, and hence a distance from the hole wall 9a or 9b of the pass-through hole portion 8 to the plugging portion 6 can increase as compared with a case where the intersection portions 10 are not present. It is to be noted that in the plugged honeycomb structure of the present invention, the plugging portion is not limited to the above-mentioned substantially quadrangular shape, and may possess a regular quadrangular shape.

Consequently, in the partition wall intersection portion 7, a portion of the partition wall 4 except the pass-through hole portion 8, i.e., an intersection portion partition wall thickness T2 from the hole wall 9a or 9b of the pass-through hole portion 8 to the intersection portion 10 of the plugging portion 6 can broaden.

In the case of the plugged honeycomb structure 1 of the present embodiment, it is designed that the shortest distance of the intersection portion partition wall thicknesses T2 is ½ or more of a partition wall thickness T1 of the partition walls 4 of the plugged honeycomb structure 1. As a result, it is possible to inhibit deterioration of strength of the plugged honeycomb structure 1 of the present embodiment having the pass-through hole portions 8.

Furthermore, in the plugged honeycomb structure 1 of the present embodiment, a value obtained by dividing a diameter D1 of a first virtual inscribed circle C1 (see a solid-line circle hatched in the circle in FIG. 3) inscribed at a position of the minimum hole width (corresponding to the hole width W) of the pass-through hole portion 8 by a diameter D2 of a second virtual inscribed circle C2 (see a broken-line circle in FIG. 3) inscribed at a position of a minimum plugging width between the plugging portions 6 facing each other (especially between the intersection portions 10) is set to a range of 0.05 to 0.74.

That is, when a diameter ratio (=D1/D2) is adjusted into the above range, the hole width W of the pass-through hole portion 8 in the partition wall intersection portion 7 and the thickness of the other portion of the partition wall 4 can be stipulated.

In the plugged honeycomb structure 1 of the present embodiment, in the one end face 2a (or the other end face 2b), the respective cells 3 are only coupled and hence a trapping efficiency does not deteriorate. On the other hand, the cells 3 extending from the one end face 2a to the other end face 2b are separated by the partition walls 4, respectively, and hence the fluid of the exhaust gas or the like is conventionally trapped. As a result, similarly to a conventional plugged honeycomb structure, the trapping efficiency of particulates of soot and the like included in the exhaust gas is not noticeably influenced.

Furthermore, the pair of cells 3 are connected by the pass-through hole portion 8, so that an open frontal area OFA in the one end face 2a (or the other end face 2b) of the plugged honeycomb structure 1 or a geometric surface area GSA can improve.

As a result, it is possible to decrease pressure loss of the plugged honeycomb structure 1 in an initial state when treating the fluid of the exhaust gas or the like and to decrease pressure loss of the plugged honeycomb structure 1 to which soot or the like during use is adhered.

That is, when the open frontal area OFA increases, it is possible to increase an amount of the fluid to flow into the plugged honeycomb structure 1 and it is also possible to decrease the pressure loss. Especially, in a case of treating the exhaust gas, the particulates of soot and the like are gradually deposited in the partition walls 4 and the surfaces in accordance with treatment time.

In this case, the pass-through hole portion 8 is interposed between the pair of cells 3, the geometric surface area GSA to trap the particulates increases, and there decreases the possibility that the particulates are partially unevenly deposited. Therefore, the decrease of the pressure loss is achieved.

Furthermore, when the geometric surface area GSA increases, a contact area with the fluid of the exhaust gas or the like increases. Consequently, opportunities for contact with a catalyst in a case where the plugged honeycomb structure is used as a catalyst carrier increase, and improvement of a purifying performance is expected.

Especially, values of the diameter D1 of the first virtual inscribed circle C1 and the diameter D2 of the second virtual inscribed circle C2 are stipulated in a range of the above condition, so that it is possible to maintain the strength of the plugged honeycomb structure 1, and it is also possible to set an optimum value of the hole width W of the pass-through hole portion 8 which is stipulated by the suitable open frontal area OFA and geometric surface area GSA.

Furthermore, in the case of the plugged honeycomb structure 1 of the present embodiment, the pair of cells 3 are connected only by one pass-through hole portion 8. Consequently, as shown in FIG. 1 and FIG. 3, in the partition wall intersection portion 7 of the one end face 2a, there are present the partition wall intersection portion 7 in which the pass-through hole portion 8 is formed (hereinafter referred to as "a formed partition wall intersection portion 7a") and the partition wall intersection portion 7 in which the pass-through hole portion 8 is not formed (hereinafter referred to as "a non-formed partition wall intersection portion 7b").

Here, the number of the formed partition wall intersection portions 7a is set to be 10% or more and 50% or less to a total number of the partition wall intersection portions 7 (a total of the formed partition wall intersection portions 7a+the non-formed partition wall intersection portions 7b) in the one end face 2a (or the other end face 2b). Here, when the ratio of the formed partition wall intersection portions 7a is smaller than 10%, it is not possible to sufficiently exert the above-mentioned effect.

On the other hand, in a case where the ratio of the formed partition wall intersection portions 7a is in excess of 50%, there occurs a case where four pass-through hole portions 8 are formed for one cell 3, and hence there is the possibility that the missing of the cell 3 occurs. Therefore, for the purpose of acquiring the strength of the plugged honeycomb structure 1 which can withstand actual use, the ratio of the formed partition wall intersection portions 7a *is stipulated in the above range.*

Figure 4:
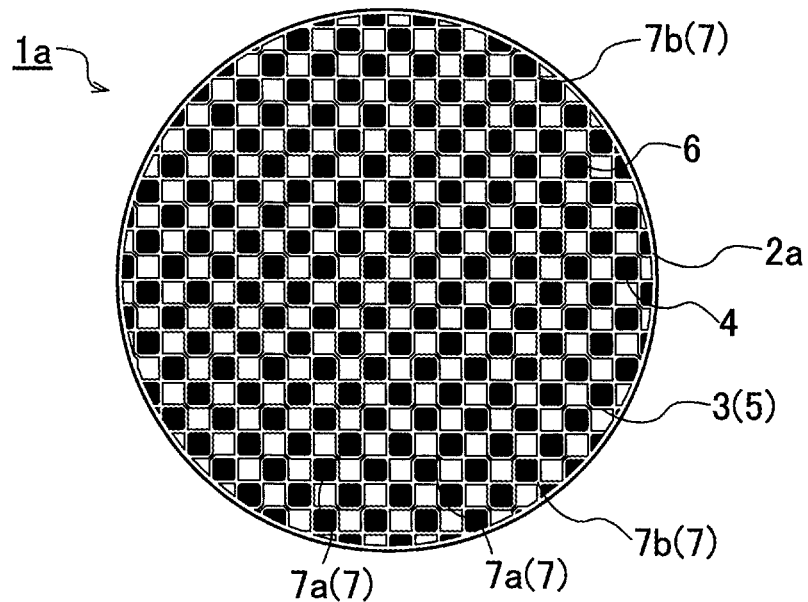
FIG. 4 is a plan view showing another example constitution of the plugged honeycomb structure in which two pass-through hole portions interconnect three cells.

It is to be noted that as shown in FIG. 4, a plugged honeycomb structure 1a may be formed in which two pass-through hole portions 8 interconnect three cells 3. Similarly, a plugged honeycomb structure (not shown) may be formed in which three pass-through hole portions at maximum interconnect four cells. In FIG. 4, the same constitution as in the plugged honeycomb structure 1 shown in FIG. 1 is denoted by the same reference numerals, and detailed description is omitted.

When employing such a structure of the cells 3 and the pass-through hole portions 8, it is possible to further improve an open frontal area OFA and a geometric surface area GSA, and it is possible to further contribute to decrease of pressure loss. On the other hand, in the plugged honeycomb structure in which one cell 3 is connected to four or more pass-through hole portions 8, there is the possibility that the missing of the cell 3 occurs, and hence it is difficult to use the plugged honeycomb structure.

Figure 5:
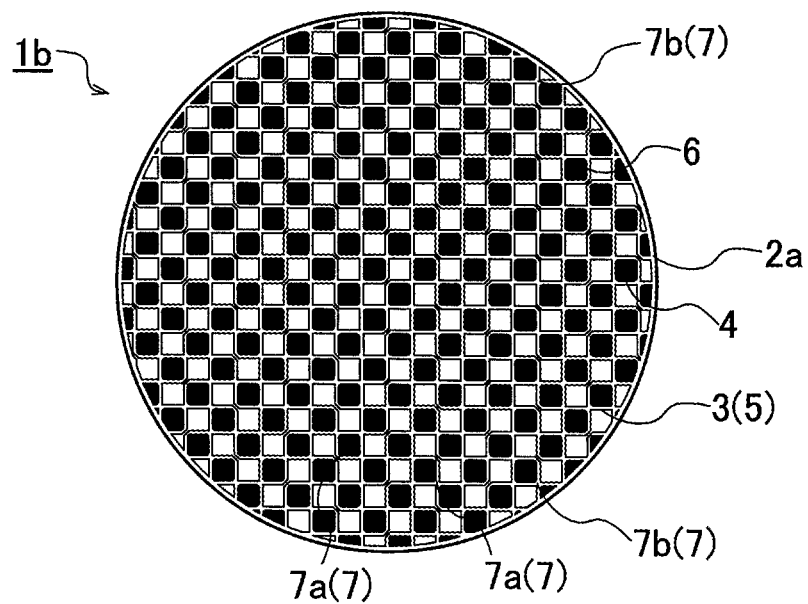
FIG. 5 is a plan view showing still another example constitution of the plugged honeycomb structure in which the pass-through hole portions are alternately arranged.

Additionally, there is not any special restriction on the arrangement of the partition wall intersection portions 7 in which the pass-through hole portions 8 are formed, and relative to the plugged honeycomb structure 1 of the present embodiment shown in FIG. 1, as shown in, for example, FIG. 5, a plugged honeycomb structure 1b may be formed so that partition wall intersection portions 7 in which pass-through hole portions 8 are formed are alternately positioned. Similarly to the above description, in FIG. 5, the same constitution as in the plugged honeycomb structure 1 shown in FIG. 1 is denoted by the same reference numerals, and detailed description is omitted.

There is not any special restriction on a material of the honeycomb structure body 5 of the plugged honeycomb structure 1, but from the viewpoint of strength, heat resistance or the like, for example, it is possible to use the honeycomb structure body containing a cordierite component or silicon carbide component, or to use the honeycomb structure body containing a silicon nitride component, an alumina component, a mullite component, a lithium aluminum silicate component or the like.

In particular, the honeycomb structure body containing the cordierite component and the silicon carbide component has heretofore been well known, and hence this honeycomb structure body is suitable. Furthermore, there is not any special restriction on a material of a plugging material forming the plugging portions 6. However, it is especially suitable to use the same material as in the honeycomb structure body 5, because their thermal expansion coefficients are matched.

Furthermore, it has been illustrated that the plugged honeycomb structure 1 of the present embodiment and the plugged honeycomb structures 1a and 1b of the other example constitutions include the lattice-like partition walls 4 defining the regular quadrangular cells 3, but the present invention is not limited to these structures.

Figure 6:
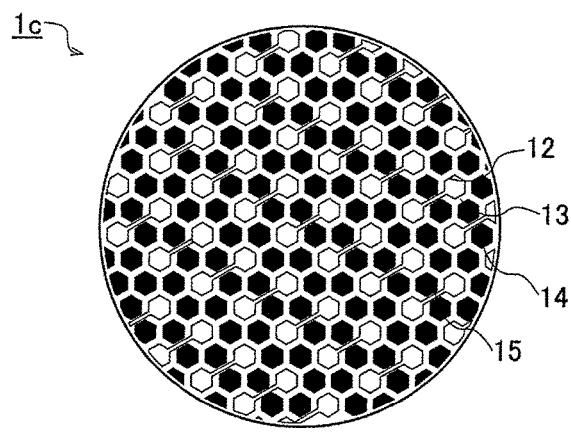
FIG. 6 is a plan view showing a further example constitution of the plugged honeycomb structure including regular hexagonal cells.

For example, as shown in FIG. 6, the plugged honeycomb structure may be a plugged honeycomb structure 1c including partition walls 13 defining regular hexagonal cells 12. In this case, six plugging portions 14 are arranged around one cell 12, and each pass-through hole portion 15 extending toward the other cell 12 can be formed between a pair of plugging portions 14.

It is to be noted that arrangements of the plugging portions 14 in which the regular hexagonal cells 12 are used and the pass-through hole portions 15 are not limited to the above arrangements, and an optimum layout is obtainable in consideration of the above-mentioned open frontal area OFA, geometric surface area GSA, pressure loss (initial, or soot) and the like. Furthermore, it is possible to optionally set correlations of a hole width of each pass-through hole portion 15, the shortest distance from each hole wall to the plugging portion 14, and the like.

2. Manufacturing Method of Plugged Honeycomb Structure

In a manufacturing method of the plugged honeycomb structure 1 of the present embodiment, about the same manufacturing method as a well-known plugged honeycomb structure manufacturing method is used, and hence detailed descriptions of, for example, respective steps of preparation of a forming raw material, drying, firing and the like is omitted. It is to be noted that in the manufacturing method of the plugged honeycomb structure 1 of the present embodiment, a characteristic item is use of a forming die (not shown) formed to match a shape of the honeycomb structure body 5 of the plugged honeycomb structure 1. Consequently, a honeycomb formed body having a region corresponding to the pass-through hole portions 8 is obtainable by extruding the forming raw material, and the honeycomb structure body 5 (the honeycomb structure) is obtainable by drying and firing this honeycomb formed body.

At this time, the forming die is used in which a position corresponding to a part of each partition wall intersection portion 7 is closed in accordance with a predetermined position and to match the hole width W of the pass-through hole portion 8. Consequently, during extrusion, by the forming die in which the position corresponding to a part of the partition wall intersection portion 7 is closed, extrusion of the forming raw material of the closed region is regulated, and the honeycomb formed body having the pass-through hole portions 8 in concerned portions is obtainable.

The hole width of the pass-through hole portion 8, the ratio of the number of the formed partition wall intersection portions 7a to the total of the partition wall intersection portions 7 in the one end face 2a (or the other end face 2b) and the like are stipulated in the above-mentioned ranges. Afterward, the plugging portions 6 are disposed to the cells 3 stipulated in accordance with the predetermined arrangement standard relative to the one end face 2a (or the other end face 2b). In consequence, manufacturing of the plugged honeycomb structure 1 of the present embodiment shown in FIG. 1 to FIG. 4 or the like is completed.

Hereinafter, examples of the plugged honeycomb structure of the present invention will be described, but the plugged honeycomb structure of the present invention is not especially limited to these examples.

EXAMPLES (1) Plugged Honeycomb Structure

On the basis of a honeycomb structure (a honeycomb structure body) made of a porous ceramics material and having a diameter of 144 mm, a length of 152 mm, a partition wall thickness of 0.3 mm, a cell density of 46 cells/em?, a porosity of 41% and an average pore diameter of 11 μm, there was prepared a plugged honeycomb structure in which a plurality of pass-through hole portions each interconnecting a pair of cells among inlet-inlet cells to enable pass-through of a fluid were disposed in parts of partition wall intersection portions of an end face on an inlet side, and plugging portions were further arranged in accordance with a predetermined arrangement standard (see FIG. 1). Additionally, a ratio of the number of the partition wall intersection portions in which the pass-through hole portions were disposed (formed partition wall intersection portions) relative to a total number of the partition wall intersection portions was 36% in the present example. Additionally, the porosity and the average pore diameter were values measured by using AutoPore 9405 model manufactured by Micromeritics or an equivalent device.

(2) Measurement of Pressure Loss and Design Factor

For the plugged honeycomb structure in which the above conditions (1) were constant, a hole width W of each pass-through hole portion was defined as a design factor, and there were studied influences on pressure loss in an initial state (hereinafter referred to as "the pressure loss (initial) (measurement conditions: an inlet gas temperature of 25° C., an inlet gas flow rate of 10 Nm³/min, an inlet gas pressure of 1 atm, and no soot)", and pressure loss in a state where soot after an exhaust gas treatment was adhered (hereinafter referred to as "the pressure loss (soot) (measurement conditions: an inlet gas temperature of 200° C., an inlet gas flow rate of 2.7 Nm³/min, an inlet gas pressure of 1 atm, and with 4 g/L of soot)". It is to be noted that measurement of pressure loss is well known and hence detailed description is omitted.

Here, the hole width W of the pass-through hole portion was changed, thereby especially influencing an open frontal area OFA, a geometric surface area GSA and an intersection portion partition wall thickness T2. Furthermore, the above-plugged honeycomb structure was set on initial conditions so that the shortest distance of the intersection portion partition wall thicknesses T2 from hole walls of the pass-through hole portions to intersection portions of plugging portions was ½ of a partition wall thickness T1 of partition walls of the plugged honeycomb structure.

Figure 7:
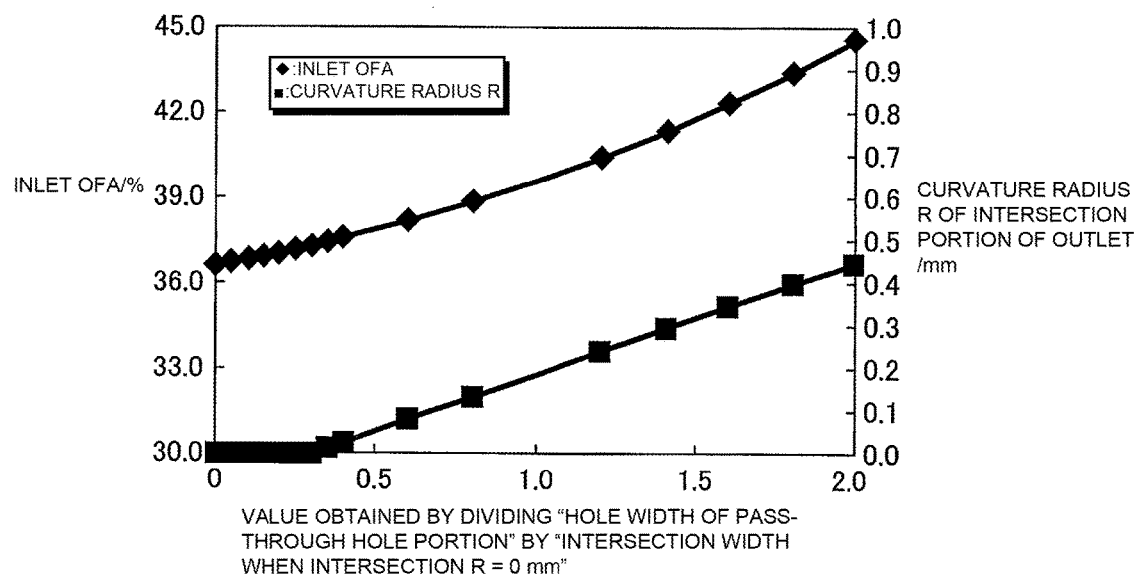
FIG. 7 is a graph showing a correlation of an inlet OFA and a curvature radius R of an intersection portion of an outlet relative to a value obtained by dividing "a hole width of the pass-through hole portion" by "an intersection width when an intersection R=0 mm"
Figure 8:
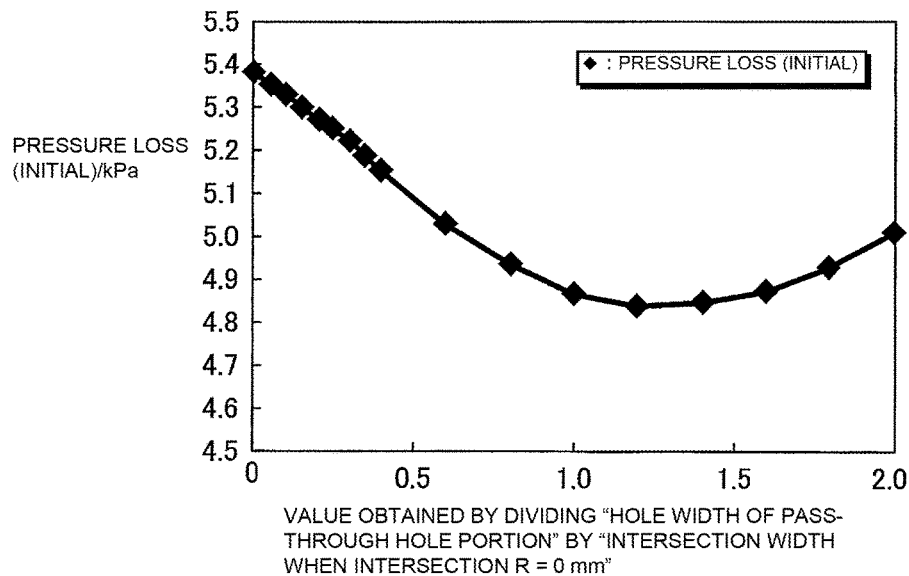
FIG. 8 is a graph showing a correlation of pressure loss (initial) relative to the value obtained by dividing "the hole width of the pass-through hole portion" by "the intersection width when the intersection R=0 mm"

FIG. 7 is a graph showing a correlation of an inlet OFA (an open frontal area on one end face side) and a curvature radius R of the intersection portion of an outlet (the other end face side) relative to the hole width W of the pass-through hole portion. Consequently, as the hole width of the pass-through hole portion increases and a ratio of the hole width increases, a value of the inlet OFA increases, and a value of a curvature radius R of the intersection portion of the outlet increases. It is to be noted that the curvature radius R increases approximately in excess of 0.3 to the ratio of the hole width of the pass-through hole portion. Furthermore, as shown in FIG. 8, it is indicated that in a case where the hole width of the pass-through hole portion is 1.2 times as large as an intersection width when the curvature radius R of the intersection portion is 0 mm, the pressure loss (initial) (the measurement conditions: the inlet gas temperature of 25° C., the inlet gas flow rate of 10 Nm³/min, the inlet gas pressure of 1 atm, and no soot) is a minimum value of 4.83 kPa. This value indicates a decrease of 10% of the pressure loss as compared with a value of 5.39 kPa of the pressure loss (initial) (the same conditions as above) in a plugged honeycomb structure of a usual cell structure.

Here, it is necessary to satisfy the conditions that the shortest distance of the intersection portion partition wall thicknesses T2 from the hole walls of the pass-through hole portions to the intersection portions of the plugging portions is at least ½ or more of the partition wall thickness T1 of the partition walls of the plugged honeycomb structure (T2≥½× T1).

Figure 9:
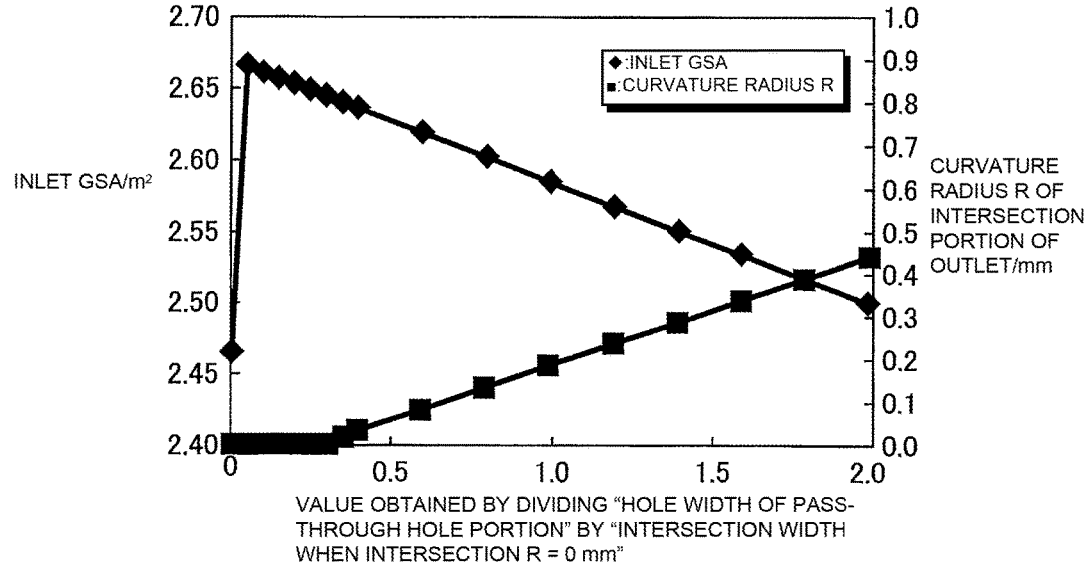
FIG. 9 is a graph showing a correlation of an inlet GSA and the curvature radius R of the intersection portion of the outlet relative to the value obtained by dividing "the hole width of the pass-through hole portion" by "the intersection width when the intersection R=0 mm"
Figure 10:
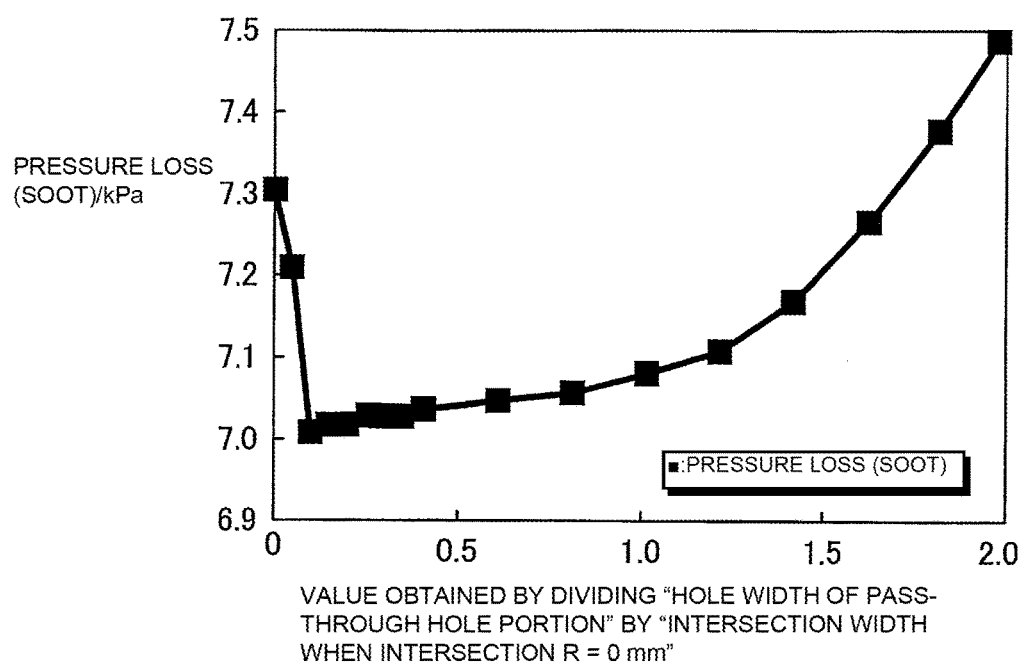
FIG. 10 is a graph showing a correlation of pressure loss (soot) relative to the value obtained by dividing "the hole width of the pass-through hole portion" by "the intersection width when the intersection R=0 mm".

Furthermore, it has been confirmed that as the hole width W of the pass-through hole portion decreases, a value of an inlet GSA (one end face side) increases (see FIG. 9), whereas it has been confirmed that as the hole width decreases, the value of the pressure loss (soot) decreases (see FIG. 10). On the other hand, when the hole width W of the pass-through hole portion increases, the curvature radius R of the intersection portion of the outlet increases. That is, the shortest distance between the intersection portion and the hole wall of the pass-through hole portion is required to be ½ of the partition wall thickness T1. At this time, when the hole width of the pass-through hole portion is 1.2 times as large as the intersection width when the curvature radius R of the intersection portion is 0 mm, a pressure loss value of 7.11 kPa which is the value of the pressure loss (soot) (the measurement conditions: the inlet gas temperature of 200° C., the inlet gas flow rate of 2.7 Nm³/min, the inlet gas pressure of 1 atm, and with 4 g/L of soot) indicates decrease of 3% relative to 7.31 kPa which is the value of the pressure loss (soot) (the same conditions as the above) of the plugged honeycomb structure of the usual cell structure.

A plugged honeycomb structure of the present invention is suitably utilizable in an exhaust gas purifying device, a particulate trapping filter or the like to remove toxic substances in an exhaust gas emitted from a car engine or the like.

DESCRIPTION OF REFERENCE NUMERALS 1, 1a, 1b and 1c: plugged honeycomb structure, 2a: one end face, 2b: the other end face, 3 and 12: cell, 4 and 13: partition wall, 5: honeycomb structure body, 6 and 14: plugging portion, 7: partition wall intersection portion, 7a: formed partition wall intersection portion (the partition wall intersection portion), 7b: a non-formed partition wall intersection portion (the partition wall intersection portion), 8 and 15: pass-through hole portion, 9a and 9b: hole wall, 10: intersection portion, C1: first virtual inscribed circle, C2: second virtual inscribed circle, D1: diameter of the first virtual inscribed circle, D2: diameter of the second virtual inscribed circle, F: flow direction of a fluid, GSA: geometric surface area, OFA: open frontal area, T1: partition wall thickness, T2: intersection portion partition wall thickness, and W: hole width (minimum hole width).

What is claimed is:

1. A plugged honeycomb structure comprising:
a honeycomb structure body having partition walls defining a plurality of cells extending from one end face to an other end face; and
a plurality of plugging portions with which the cells of the one end face are plugged in accordance with a predetermined arrangement standard and with which the residual cells of the other end face are plugged in accordance with the arrangement standard,
wherein the honeycomb structure body further comprises pass-through hole portions each of which is formed in at least a part of a partition wall intersection portion in which the partition walls intersect in one of the one end face and the other end face and each of which interconnects a pair of cells facing each other at a position corresponding to the partition wall intersection portion and opening on the side of the one end face or the other end face to enable pass-through of a fluid,
the pass-through hole portions only interconnect cells of the one end face without plugging portions, and
a value obtained by dividing a diameter of a first virtual inscribed circle inscribed at a position of a minimum hole width of the pass-through hole portion by a diameter of a second virtual inscribed circle inscribed at a position of a minimum plugging width between plugging portions facing each other is in a range of 0.05 to 0.74.

2. The plugged honeycomb structure according to claim 1, wherein a minimum distance of intersection portion partition wall thicknesses from hole walls of the pass-through hole portions to intersection portions of the plugging portions is ½ or more of a partition wall thickness of the partition walls.

3. The plugged honeycomb structure according to claim 1, wherein the number of the partition wall intersection portions in which the pass-through hole portions are formed is in a range of 10% or more and 50% or less to a total number of the partition wall intersection portions in the one end face.

4. The plugged honeycomb structure according to claim 1, wherein each of the cells is connected to three pass-through hole portions at maximum to interconnect the cells facing each other.

5. The plugged honeycomb structure according to claim 1, wherein each of the cells is connected to one pass-through hole portion to interconnect the cells facing each other.

6. The plugged honeycomb structure according to claim 1, wherein the honeycomb structure body contains a cordierite component or a silicon carbide component.

7. The plugged honeycomb structure according to claim 1, wherein the cells possess one of a regular quadrangular shape and a regular hexagonal shape.

8. The plugged honeycomb structure according to claim 1, wherein the honeycomb structure body is a porous ceramic material in which a porosity is in a range of 30% to 80% and an average pore diameter is in a range of 5 μm to 30 μm.

* * * * *